United States Patent
Yap et al.

(10) Patent No.: US 7,532,636 B2
(45) Date of Patent: May 12, 2009

(54) HIGH BUS BANDWIDTH TRANSFER USING SPLIT DATA BUS

(75) Inventors: Keng Teck Yap, Selangor (MY); Azydee Hamid, Penang (MY)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 11/246,601

(22) Filed: Oct. 7, 2005

(65) Prior Publication Data

US 2007/0081546 A1    Apr. 12, 2007

(51) Int. Cl.
*G06F 13/00* (2006.01)
(52) U.S. Cl. .................. 370/423; 710/110; 710/113
(58) Field of Classification Search ................ 370/423; 710/110, 113, 306, 317
See application file for complete search history.

(56) References Cited

U.S. PATENT DOCUMENTS

| | | | | |
|---|---|---|---|---|
| 5,901,295 A | * | 5/1999 | Yazdy | 710/113 |
| 6,081,860 A | * | 6/2000 | Bridges et al. | 710/110 |
| 6,393,506 B1 | * | 5/2002 | Kenny | 710/113 |
| 6,715,023 B1 | * | 3/2004 | Abu-Lebdeh et al. | 710/317 |
| 6,766,386 B2 | * | 7/2004 | Dobson et al. | 710/39 |
| 6,954,821 B2 | * | 10/2005 | Fitzsimmons et al. | 710/317 |
| 6,981,088 B2 | * | 12/2005 | Holm et al. | 710/306 |
| 7,099,983 B2 | * | 8/2006 | Emerson et al. | 710/306 |
| 7,174,403 B2 | * | 2/2007 | Ganasan | 710/113 |
| 2002/0147871 A1 | * | 10/2002 | Koike | 710/107 |

OTHER PUBLICATIONS

AMBA Specification (Rev 2.0), ARM Limited, chapters 1-3, 1999.

* cited by examiner

*Primary Examiner*—Hassan Kizou
*Assistant Examiner*—Emmanuel Maglo
(74) *Attorney, Agent, or Firm*—Blakely, Sokoloff, Taylor & Zafman LLP

(57) ABSTRACT

Methods and apparatus for achieving high bus bandwidth transfer using a split data bus. A data bus is split into multiple segments whose access is, individually controlled by an arbitration control unit in a manner that supports concurrent data transfers. Thus, the split data bus is able to concurrently transfer data between multiple master-slave pairs during a given data cycle. A split address but is provided to allow concurrent access requests to be considered for grant. In one embodiment, the data bus includes a read data bus and a write data bus.

21 Claims, 11 Drawing Sheets

HIGH BUS BANDWIDTH TRANSFER USING SPLIT DATA BUS

FIELD OF THE INVENTION

The field of invention relates generally to network equipment and, more specifically but not exclusively relates to a method and apparatus for achieving high bus bandwidth transfer using a split data bus design.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are collectively referred to as "packet processing."

Modern network processors perform packet processing using multiple multi-threaded processing elements (referred to as microengines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to cryptographic processors, hash units, general-purpose processors, and expansion buses, such as the PCI (peripheral component interconnect) and PCI Express bus.

In general, the various processing elements network processor, as well as other optional components, will share access to various system resources. Such shared resources typically include data storage and processing units, such as memory stores (e.g., SRAM, DRAM), UARTs, input/output (I/O) interfaces etc. The shared resources and their consumers are interconnected via sets of buses that are shared by the various processing elements and other bus masters.

Under typical network processor configurations, various bus schemes are employed to support access to the shared resources. Since only a single set of signals can be present on a given bus at any point in time, buses require multiplexing and the like to allow multiple resource consumers to access multiple resource targets coupled to the bus. In order to enable access by all consumers, a bus arbitration scheme must be employed, such that when multiple access requests are submitted concurrently, one of those requests is granted, while the other requests are denied.

In accordance with one conventional technique, bus access is supported in the following manner. Multiple bus masters, such as processors, DMA (direct memory access) controllers, and the like are coupled to a common bus with a fixed width, such as 32-bits or 64-bits. During a bus cycle, one or more masters will submit a request (e.g., asserts a request signal) to a bus arbiter to access the bus. In this case of multiple requests occurring during the same cycle, the arbiter will apply an arbitration policy, such as round-robin, to determine which master to grant the bus access to. In response to receiving an access grant, the master will drive out an address of a targeted slave on an address bus, which will be sampled by all of the slaves tied to the bus. The targeted slave will recognize that the access request is for that slave, while the other slaves will ignore the request. Following this address and control set-up sequence, one or more bus cycles are employed for transferring the data between the master and the slave. For data reads, data is transferred from a slave to a master. For data writes, data is transferred from a master to a slave.

Under conventional practices, only one transfer may be present on a shared data bus at one time. While this simplifies arbiter and control logic, it limits the amount of throughput that the bus may support.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for achieving high bus bandwidth transfer using a split data bus are described herein. In the following description, numerous specific details are set forth, such as exemplary implementations designed for network processors, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to aspects of the embodiments described herein, a split data bus and control structure is disclosed that supports multiple concurrent transactions amongst multiple masters and slaves that are tied to the bus. The split data bus supports flexible use cases involving various combinations of concurrent data transactions. This allows the bus to provided increased bandwidth when compared with conventional bus designs.

Figure 1:
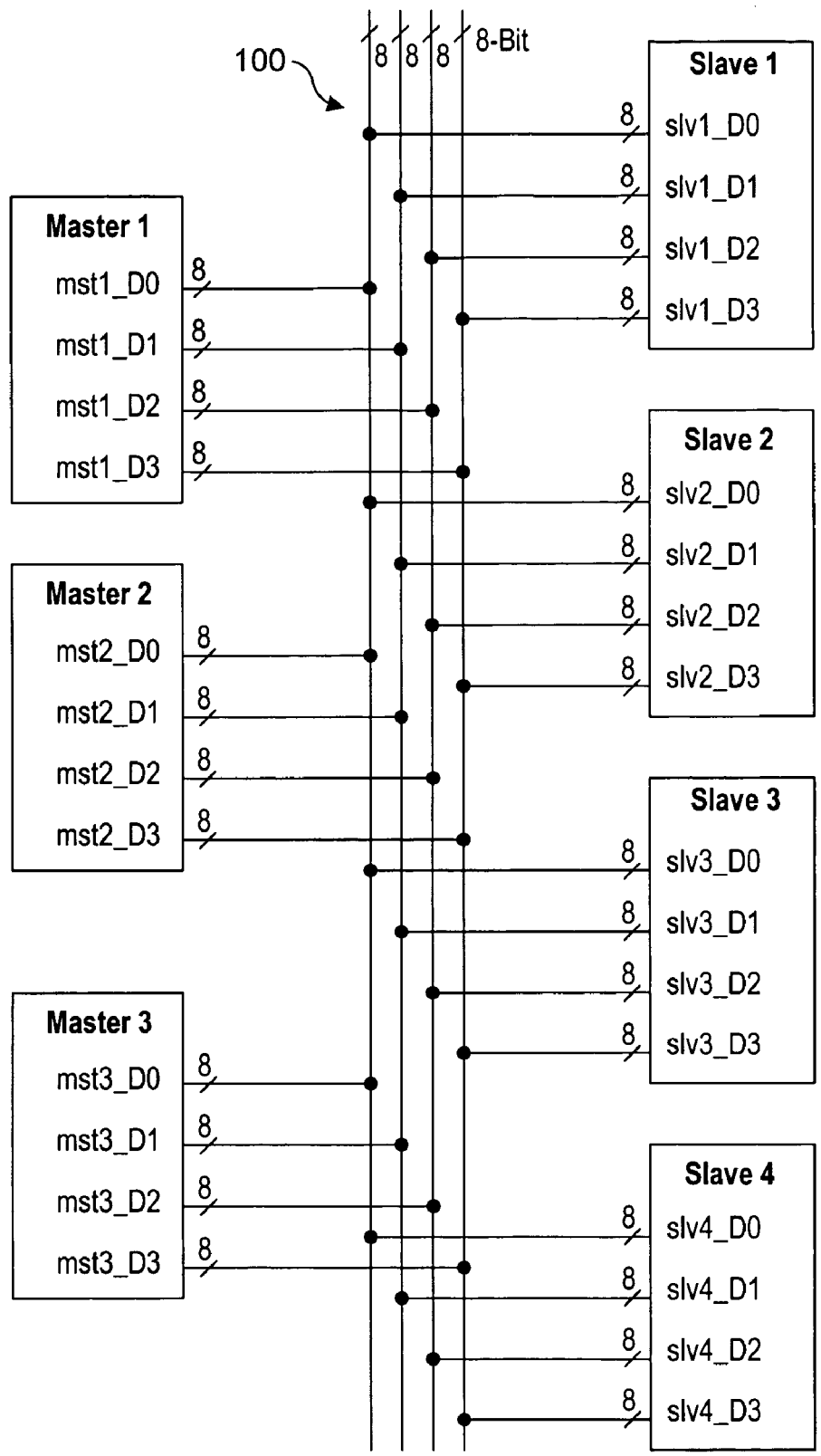
FIG. 1 is a schematic diagram of an exemplary split data bus architecture, according to one embodiment of the invention.

By way of example, FIG. 1 conceptually illustrates an exemplary bus 100 configuration in accordance with one embodiment that three bus masters 1, 2, and 3, with access to four slaves 1, 2, 3, and 4. As illustrated, bus 100 comprises a 32-bit but that is split into four 8-bit (i.e., single-byte) segments. Similarly, the 32-bit data paths for each of masters 1, 2, and 3 and slaves 1, 2, 3, and 4 are split into four 8-bit chunks. For example, the data paths for master 1 includes respective 8-bit chunks labeled mst1_D0, mst1_D1, mst1_D2 and mst1_D3. The data path chunks for the other masters and slaves are similarly labeled.

The split data bus approach used by bus 100, as well as other embodiments disclosed below, enables concurrent data transactions having an aggregate chunk width of less than or equal to the overall bus width to be supported. Meanwhile, the split data bus may also function in the conventional manner, enabling it to support single full width transactions, as well as partial-width transactions. For example, it is possible for the following conventional and concurrent data transactions to occur during a given data cycle:

1) One 8-bit (single-byte) transfer;
2) One 16-bit (half-word) transfer;
3) One 32-bit (word) transfer;
4) A combination of two single-byte transfers;
5) A combination of a single-byte and a half-word transfer;
6) A combination of two single-byte and a half-word transfer;
7) A combination of three single-byte transfers;
8) A combination of four single-byte transfers; and
9) A combination of two half-word transfers.

In the case of four concurrent single-byte transfers, a fourth master (not shown) would be tied to bus 100 in FIG. 1.

In accordance with further aspects of the split-bus approach, a non-serviced (for a given cycle) master need not wait for a multi-cycle transfer process for another (or other) master(s) to complete prior to submitting an access request. For example, suppose that Master 1 has been granted an 8-byte data transfer using four half-word transfers, while Master 2 has been concurrently granted a 2-byte data transfer using a single half-word transfer. Accordingly, during a first data cycle (after the address/control cycle used for set-up), all four of the 8-bit bus segments will be in use. However, after the first cycle, half of the 8-bit bus segments will become available while the remaining portion of Master 1's 8-byte transfer is completed. These bus segments can be used to support new data transfers that are initiated while Master 1's transfer is ongoing. As a result, bus access and transfers from different masters may occur in an asynchronous manner.

As with conventional bus transfers, the split data bus employs a two-phase transfer processing. The first phase, address and control, is facilitated by a separate address bus, arbiters, and control signals. The second phase, data transfer is likewise facilitated by a separate data bus. Moreover, in one embodiment, separate read data and write data buses are employed, as described in further detail below.

Figure 2:
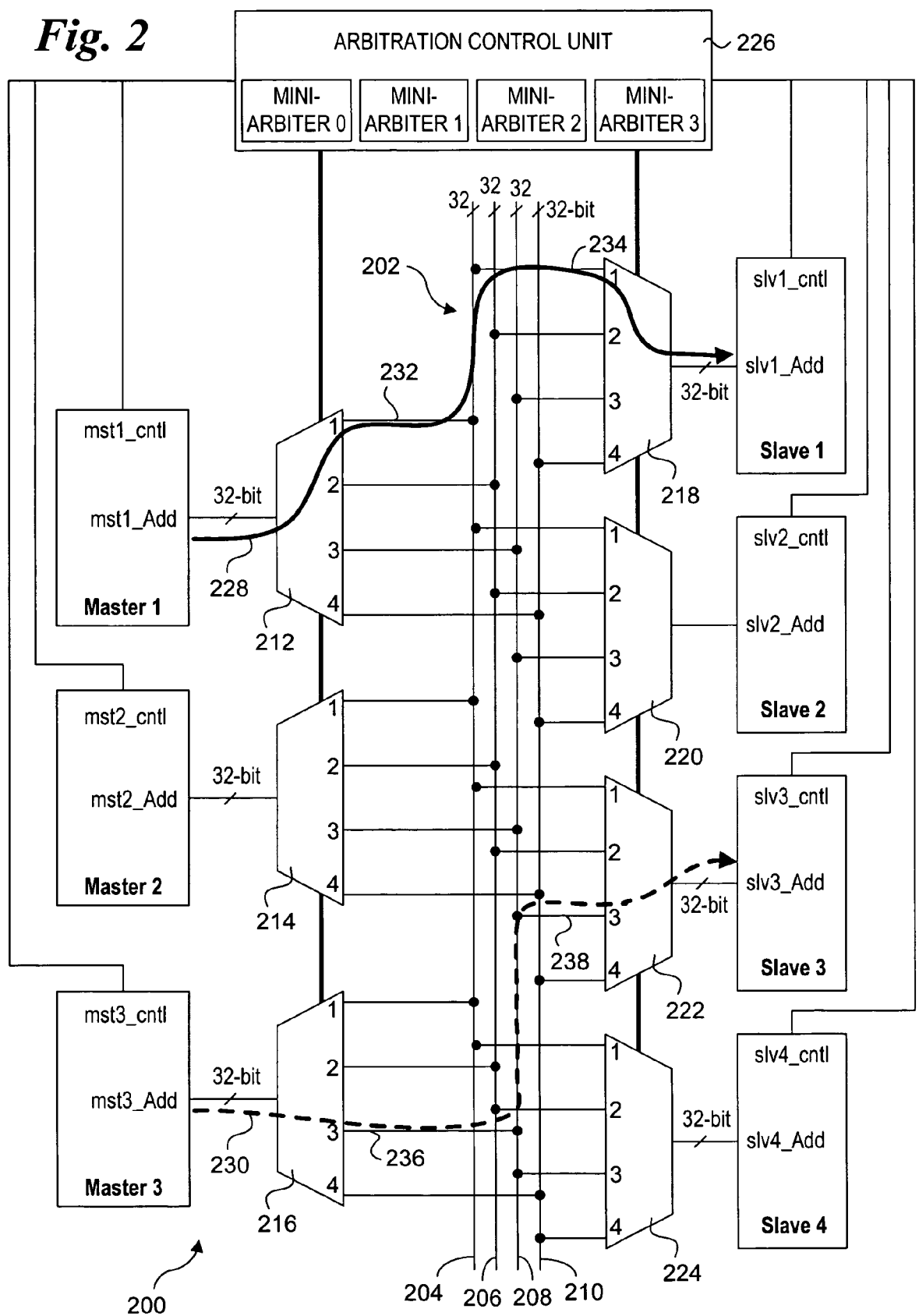
FIG. 2 is a schematic diagram of an exemplary split address bus architecture, according to one embodiment.

Details of one embodiment of an address bus and control architecture 200 is shown in FIG. 2. The architecture includes multiple address bus lines 202, grouped in 32-bit sets. In general, the number of 32-bit address bus line sets will equal the number of slaves for which shared access to the bus structure is supported. Accordingly, in the illustrated embodiment of FIG. 2 four 32-bit address bus lines sets 204, 206, 208, and 210 are provided.

Each of Masters 1, 2, and 3 and Slaves 1, 2, 3, and 4 employ 32-bit address bus interfaces in the conventional manner. However, rather than being tied directly to single 32-bit address bus, each of the respective address bus interfaces (mst1_Add, mst2_Add, and mst2_Add) for Masters 1, 2, and 3 is operatively coupled to address bus line sets 204, 206, 208, and 210 via a respective multiplexer 212, 214, and 216. Meanwhile, the address bus interfaces slv1_Add, slv2_Add, slv3_Add, and slv4_Add for each of Slaves 1, 2, 3, and 4 is coupled to address bus line sets 204, 206, 208, and 210 via respective multiplexers 218, 220, 222, and 224.

The various multiplexer enable data bus access requests to be routed to the appropriate slave target. The control of the multiplexers, as well as arbitration of data bus access is facilitated by an arbitration control unit 226. In further detail, arbitration control unit 226 includes a mini-arbiter associated with each 8-bit bus segment, as depicted by mini-arbiters 0, 1, 2, and 3.

During a bus access request, an address is asserted on the address bus interface for the master issuing the request. At the same time, control signals are passed to arbitration control unit 226 to identify the type, and width of the request. These control signals are depicted as mst1_cntl, mst2_cntl, and mst3_cntl signals for Masters 1, 2, and 3, respectively. Notably, multiple concurrent bus access requests are supported, such that any master may replace a bus access request during any given cycle. In addition, as described below in further detail, a master may submit a request to access a selected slave that is being "mastered" by another master, wherein multiple masters are enabled to concurrently access data chunks from the same slave.

FIG. 2 further depicts an example of the use of address bus and control architecture 200 to support two concurrent transactions. Master 1 sends address and control signals for a byte (or half-word) transfer to Slave 1, as illustrated by the solid line 228. Concurrently, Master 3 asserts address and control signals for a byte (or half-word) transfer with Slave 3, as illustrated by the dashed line 230

In further detail, Master 1 asserts a 32-bit address that is multiplexed by multiplexer 212 to bus line set 204 via a cross-bar connection 232. The signals on 25 bus line set 204 are coupled to multiplexer 218 via a cross-bar connection 234. Multiplexer 218, in turn, multiplexes signals received at cross-bar connection 234 to the 32-bit input address lines of Slave 1 during the address cycle. The arbitration of the multiplexers 212, 214, 216, 218, 220, 222, and 224 (and thus access to the address bus interconnect structure) is provided by arbitration control unit 226 in view of control signals asserted by Masters 1, 2 and 3, during a address given cycle.

A similar process applies to the address request from Master 3 to Slave 3. Master 3 asserts a 32-bit address that is multiplexed by multiplexer 216 to bus line set 208 via a cross-bar connection 236. The signals on bus line set 208 are coupled to multiplexer 222 via a cross-bar connection 238. Multiplexer 222 then multiplexes signals received at cross-bar connection 238 to the 32-bit input address lines of Slave 1 during the address cycle.

Under the instant example, Master 1 desires to perform an 8-bit (single byte) or 16-bit (half-word) transaction with Slave 1, while Master 3 desires to perform an 8-bit or 16-bit transaction with Slave 3. Since the total number of bits for the combined transactions is 32-bits or less, both transactions are granted by arbitration control unit 226, and concurrent data transfers are performed during one or more subsequent data cycles. It is noted that the number of data cycles for concurrent transactions may be the same (e.g., a single cycle) or may differ, depending on the size of the transaction.

In conjunction with access requests made via the foregoing address bus, actual data transfers are supported during associated data cycles via the use of a split data bus. More particularly, in one embodiment separate split read and write data buses are provided, such that read and write transactions involving the same slaves and masters may be performed concurrently. However, this is not meant to be limiting, as the principles disclosed herein may be implemented using a single split data bus that is employed for both read and write transactions.

To further clarify the use of separate read and write data buses, one should consider the conventional nomenclature used for transactions in bus mastering systems. For example, a data transfer from a slave to a master is referred to as a data read, while a data transfer from a master to a slave is referred to as a data write.

In order to transfer data between masters and slaves (both reads and writes), appropriate multiplexing is provided to manage access to the shared data bus. Under a conventional data bus, access to the full bus width is granted to a single master during a given data cycle. (Under separate read and write data buses, a single respective master is granted access to each data bus.) In contrast, under embodiments disclosed herein, the full bus width is split into 8-bit segments, enabling concurrent usage of a single (read or write) data bus.

Figure 3:
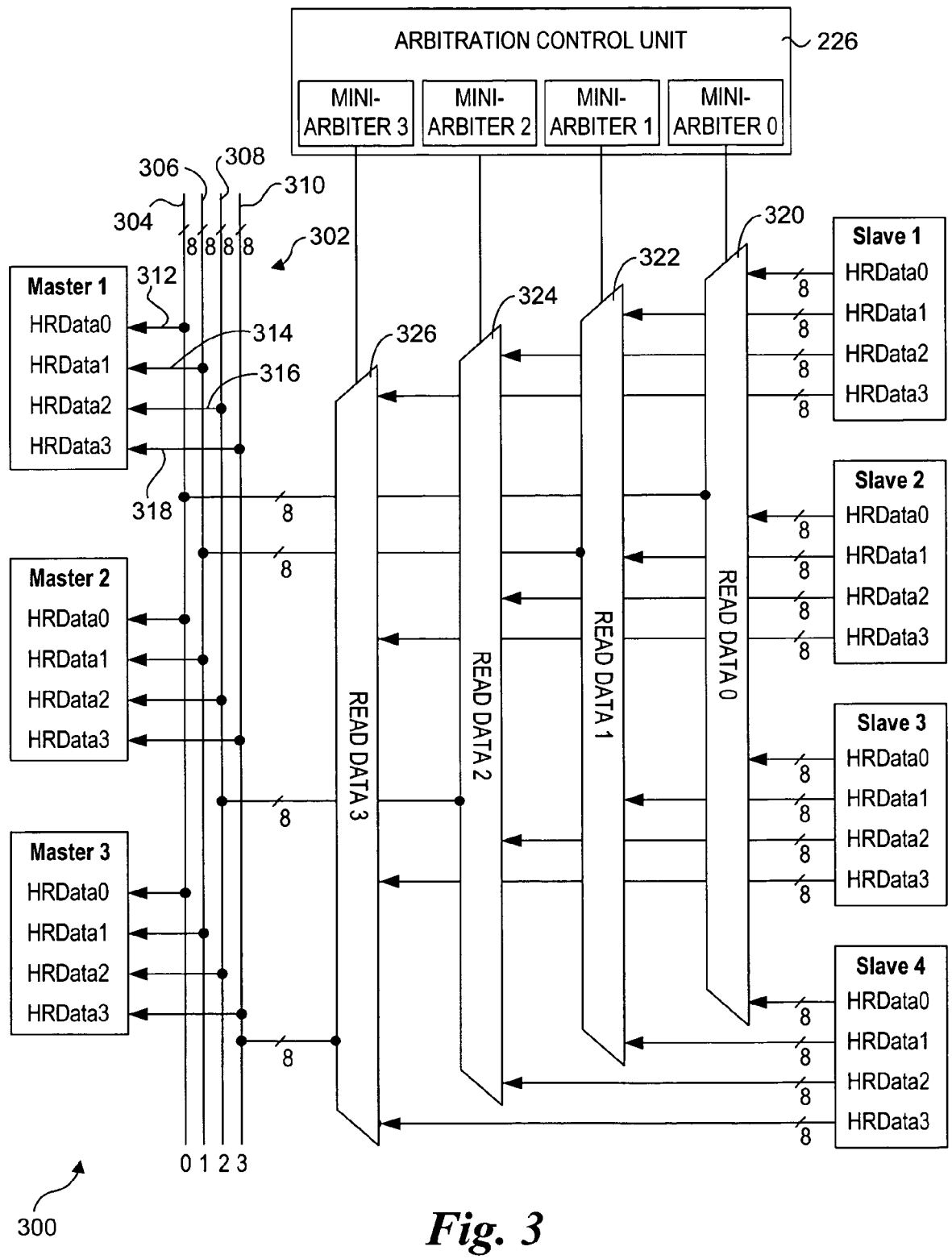
FIG. 3 is a schematic diagram of an exemplary split read data bus architecture, according to one embodiment.

FIG. 3 shows one embodiment of a split read data bus architecture 300. The architecture includes a split read data bus 302 that is split into four 8-bit wide sets of bus lines 304, 306, 308, and 310 having an aggregate width of 32 bits. Each of bus lines sets 304, 306, 308, and 310 is used to transfer data corresponding to a respective data chunks 0, 1, 2, and 3 for each of Masters 1, 2, and 3. Accordingly, each of the sets of bus lines is coupled to Masters 1, 2, and 3, via a respective cross-bar connection for an associated data chunk. For example, cross-bar connections 312, 314, 316, and 318 are employed to connect to Master 1 to respective bus lines sets 304, 206, 308, and 310 to host data chunks HRData0, HRData1, HRData2, and HRData3. (Under the "HR" terminology employed in the figures herein, the "R" indicates "read", while the "H" represents a high-speed bus that is used to distinguish the data, address, and control signals from other system buses.) Similar cross-bar connections are provided for each of Masters 2 and 3. In a similar manner, the number of Masters may be easily scaled, with each master being provided with a four member set of cross-bar connections.

Meanwhile, slave-side access to split read data bus 302 is facilitated via four read data multiplexers 320, 322, 324, and 326, which are respectively controlled by mini-arbiters 0, 1, 2, and 3 of arbitration control unit 226. In the illustrated embodiment, each of read data multiplexers 320, 322, 324, and 326 includes four inputs coming from a respective slave (e.g., Slaves 1, 2, 3, and 4). In a similar manner, the architecture may be scaled to support any number of slaves. At the same time, the number of multiplexers will always equal the number of split segments in the split data bus, regardless of the numbers of masters or slaves connected to the split data bus.

In addition to the illustrated connections, each of the various masters and slaves includes control signal lines to convey control signals to and from arbitration control unit 226, as shown in FIG. 2. For simplicity and clarity, these control signal lines are not shown in the read and write split data bus architectures illustrated herein, although it will be understood that such signal lines will be present in an actual implementation of these split data buses.

Each of read data multiplexers 320, 322, 324, and 326 receives input from an associated read data chunk for each slave. For example, read data multiplexer 320 is used to multiplex HRData0 data chunks from each of Slaves 14, while read data multiplexer 322 is used to multiplex HRData1 data chunks from each the slaves, and so on. Meanwhile each read data multiplexer has a single output that is 8-bits wide that is tied to an associated bus line set. More specifically, the respective outputs of multiplexers 320, 322, 324, and 326 are coupled to bus line sets 304, 306, 308, and 310.

Figure 3A:
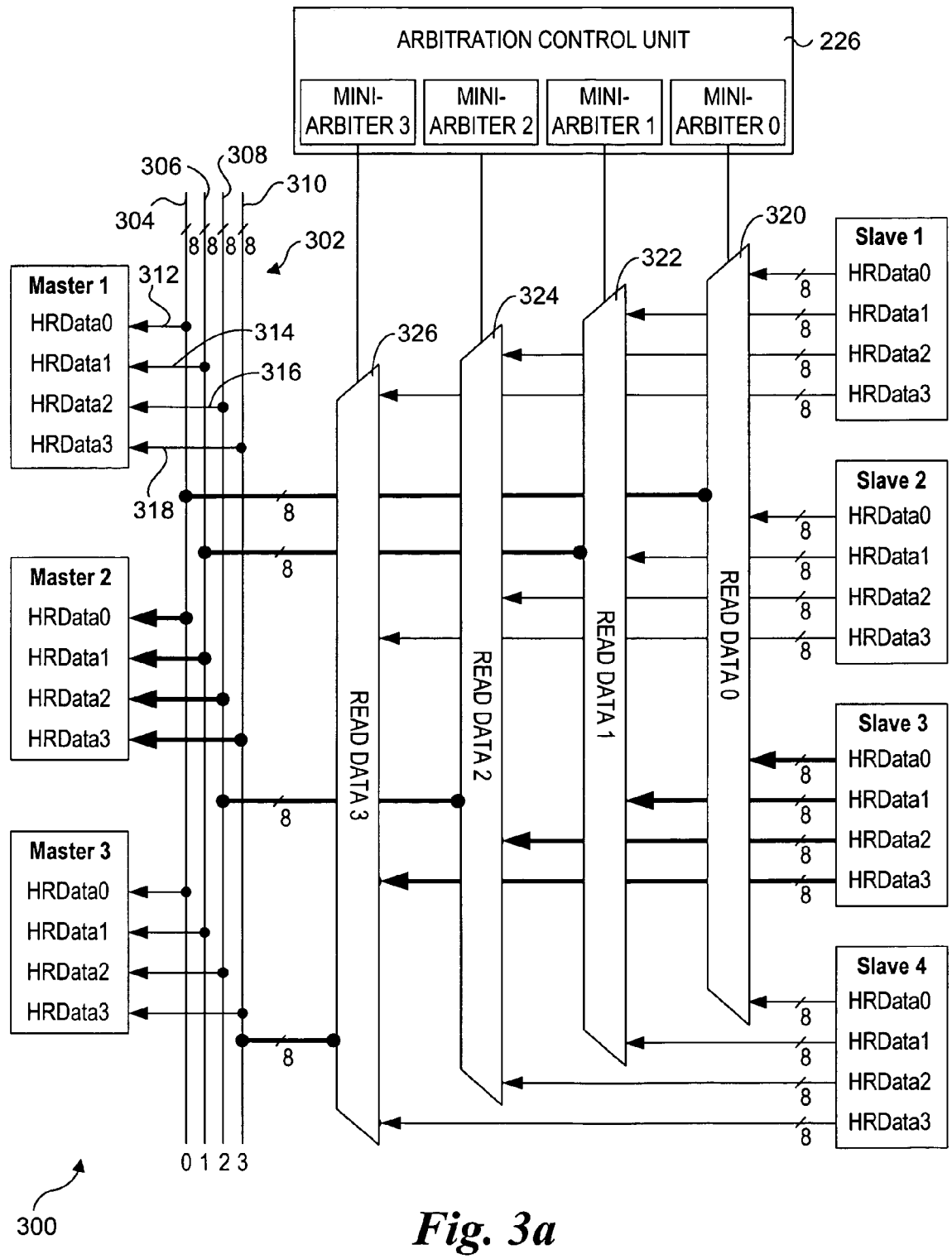
FIG. 3a illustrates a single word read data transfer using the split read data bus architecture of FIG. 3.

During a given read data cycle, each of multiplexers 320, 322, 324, and 326 is controlled by respective mini-arbiters 0, 1, 2, and 3 to enable either 0, 8, 16, or 32 bits of data to be transferred from selected Slaves 1-4 in response to corresponding read data bus grants issued by arbitration control unit 226 to Masters 1-3. For example, FIG. 3a illustrates a single word (32-bit) read data transfer from Slave 3 to Master 2. Under this transfer, each of multiplexers 320, 322, 324, and 326 is controlled by respective mini-arbiters 0, 1, 2, and 3 to forward data received from the HRData0-3 8-bit chunks from Slave 3. Meanwhile, each of the HRData0-3 input lines for Master 2 are enabled, while the HRData0-3 input lines for each of Masters 1 and 3 are disabled. The enabling/disabling function may be provided internally or externally to the blocks representing Masters 1-3 using well-known techniques, such as various types of buffering schemes.

Figure 3B:
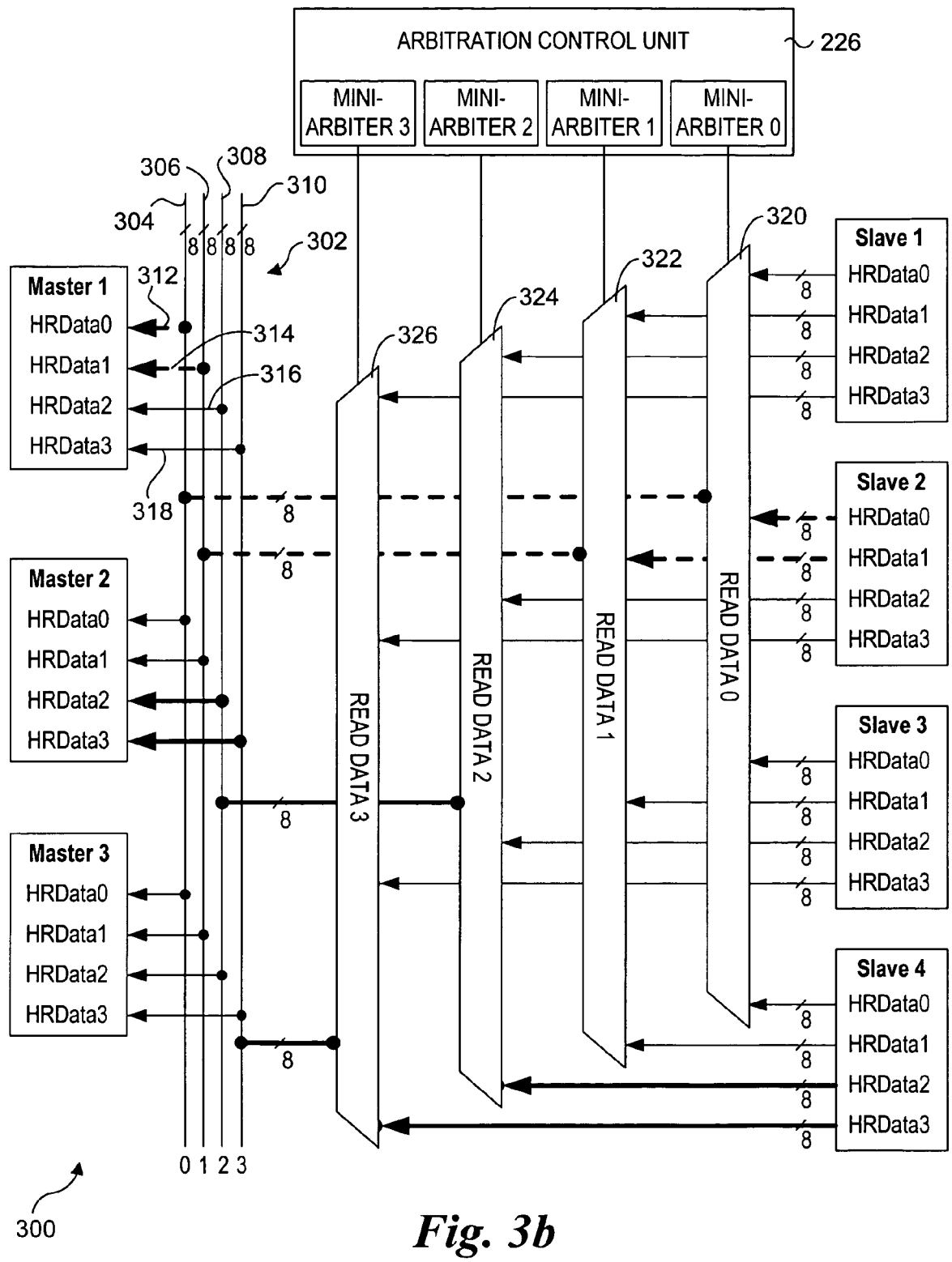
FIG. 3b illustrates a concurrent pair of half-word read data transfers using the split read data bus architecture of FIG. 3.

In the data transfer illustrated in FIG. 3b, a pair of concurrent half-word (16-bit) transfers are supported. In further detail, a first half-word transfer corresponding to data chunks HRData0 and HRData1 is provided from Slave 2 to Master 1. Concurrently, a second half-word transfer corresponding to data chunks HRData2 and HRData3 is provided from Slave 4 to Master 2.

Figure 3C:
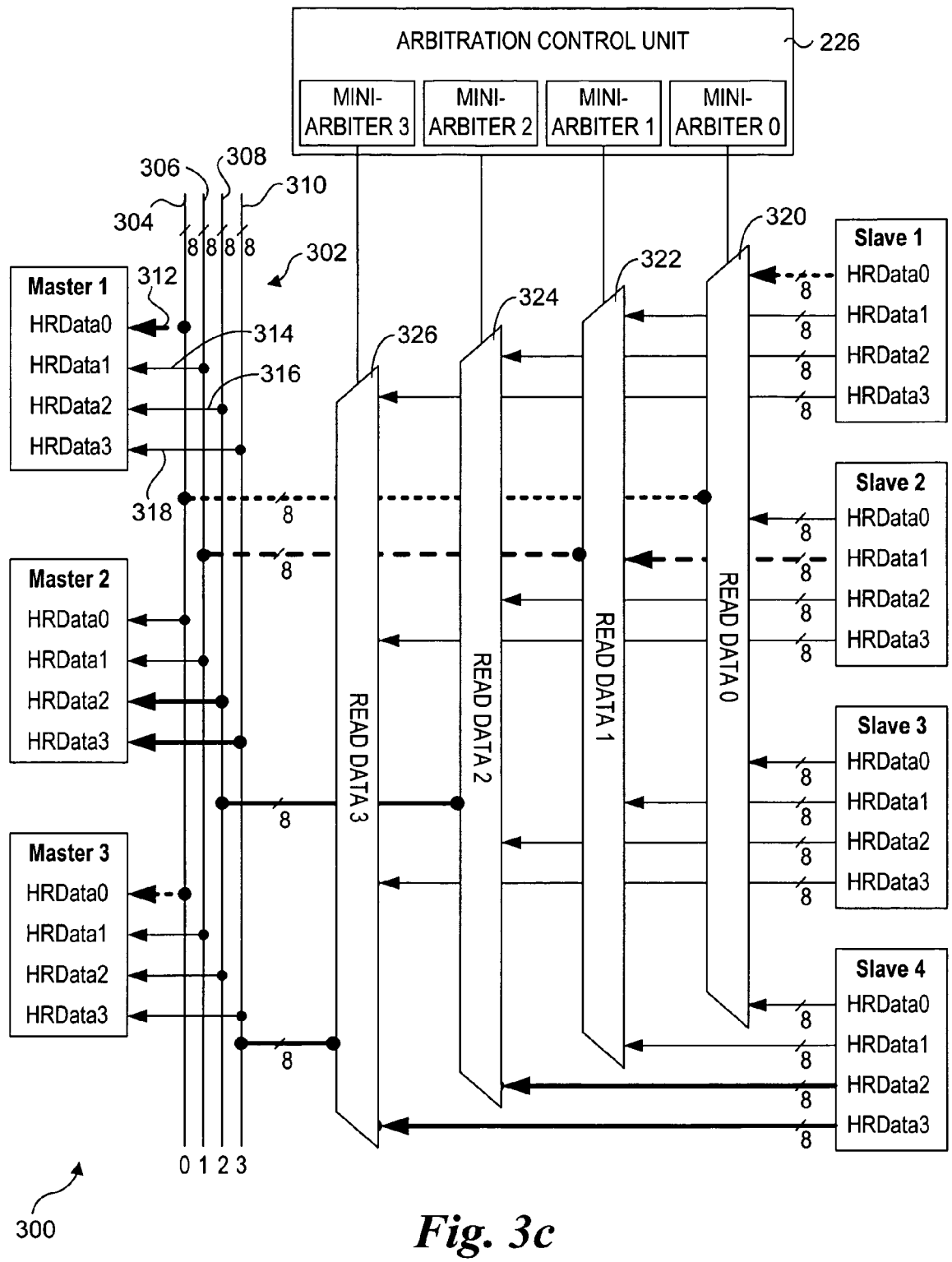
FIG. 3c illustrates a concurrent set of transfers including a pair of single-byte and a half-word word read data transfer using the split read data bus architecture of FIG. 3.

FIG. 3c illustrates a concurrent read data transfer involving three concurrent transfers. These include a first single-byte transfer corresponding to HRData0 from Slave 1 to Master 3, a second single-byte transfer corresponding to HRData1 from Slave 2 to Master 1, and a half-word transfer comprising data chunks HRData 2 and HRData 3 from Slave 4 to Master 2.

In addition to the exemplary concurrent transfers illustrated in FIGS. 3ac, other transfer configurations may also be supported during a given read data cycle. These include single and half-word transfers from a selective slave to a requesting master, as well as four concurrent single-byte transfers. In this latter case, another master (not shown) would typically be employed for the fourth transfer.

Figure 4:
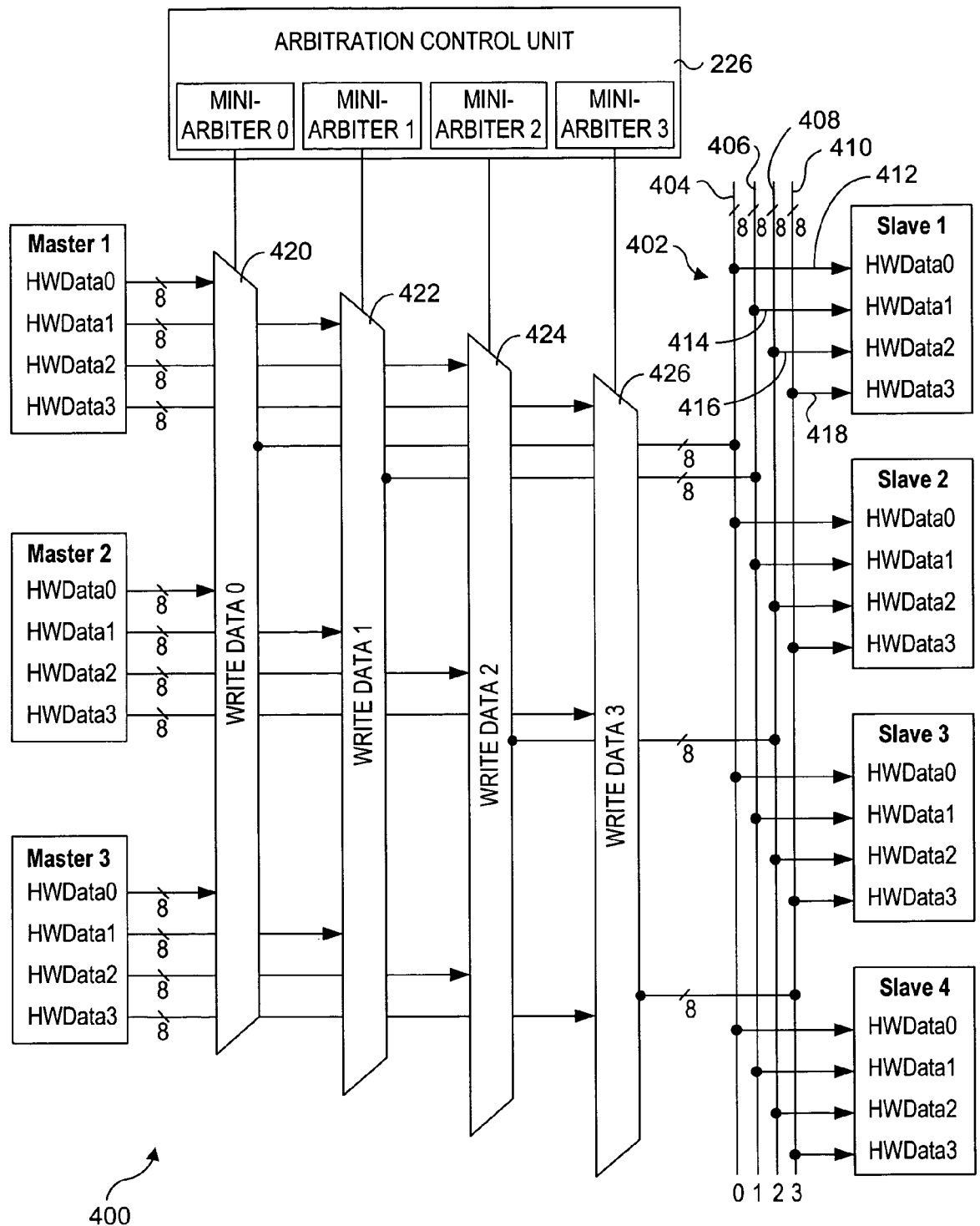
FIG. 4 is a schematic diagram of an exemplary split write data bus architecture, according to one embodiment.

FIG. 4 shows one embodiment of a split write data bus architecture 400. The architecture includes a split write data bus 402 that is split into four 8-bit wide sets of bus lines 404, 406, 408, and 410 having an aggregate width of 32 bits. Each of bus lines sets 404, 406, 408, and 410 is used to transfer data corresponding to a respective data chunks 0, 1, 2, and 3 to each of Slave 1, 2, 3, and 4. Thus, each of the sets of bus lines is coupled to Slaves 1-4 via a respective cross-bar connection for an associated data chunk. For example, cross-bar connections 412, 414, 416, and 418 are employed to connect to Slave 1 to respective bus lines sets 304, 206, 308, and 310 to facilitate transfer of data chunks HWData0, HWData1, HWData2, and HWData3 between the various masters and slaves. (Under the "HW" terminology employed in the figures herein, the "W" indicates "write".) Similar cross-bar connections are provided for each of Slaves 2, 3, and 4. In a similar manner, the number of slaves may be easily scaled, with each slave being provided with a four member set of cross-bar connections to split write data bus 402.

In a manner similar to the foregoing split read data bus architecture, master-side access to split write data bus 402 is facilitated via four write data multiplexers 420, 422, 424, and 426, which are respectively controlled by mini-arbiters 0, 1, 2, and 3 of arbitration control unit 226. In the illustrated embodiment, each of read data multiplexers 420, 422, 424, and 426 includes four inputs coming from a respective master (e.g., Masters 1, 2, and 3). In a similar manner, the split write data bus architecture may be scaled to support any number of masters. As before, the number of multiplexers will always equal the number of split segments in the split write data bus, regardless of the numbers of masters or slaves connected to the split write data bus.

Figure 4A:
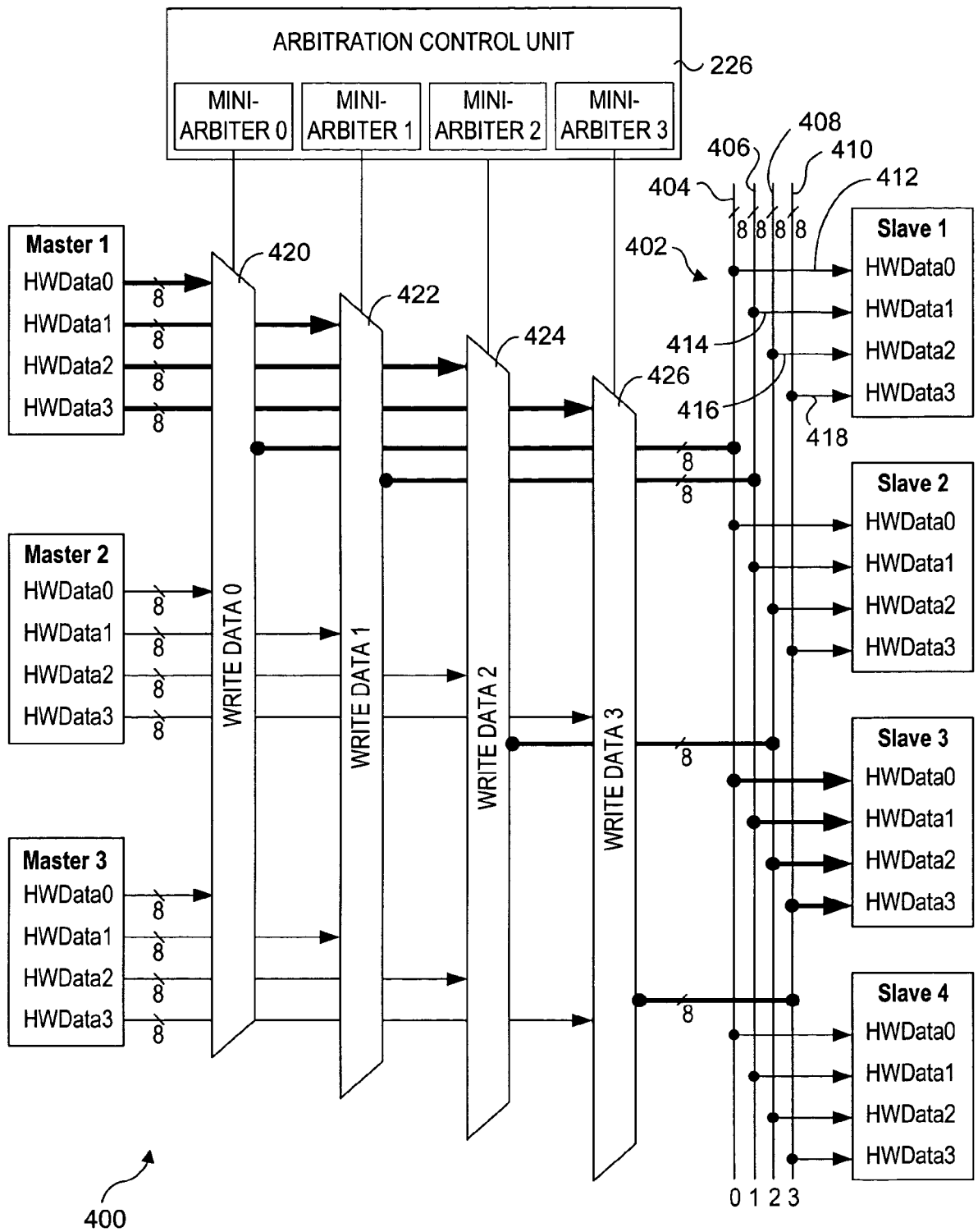
FIG. 4a illustrates a single word write data transfer using the split write data bus architecture of FIG. 4.
Figure 4B:
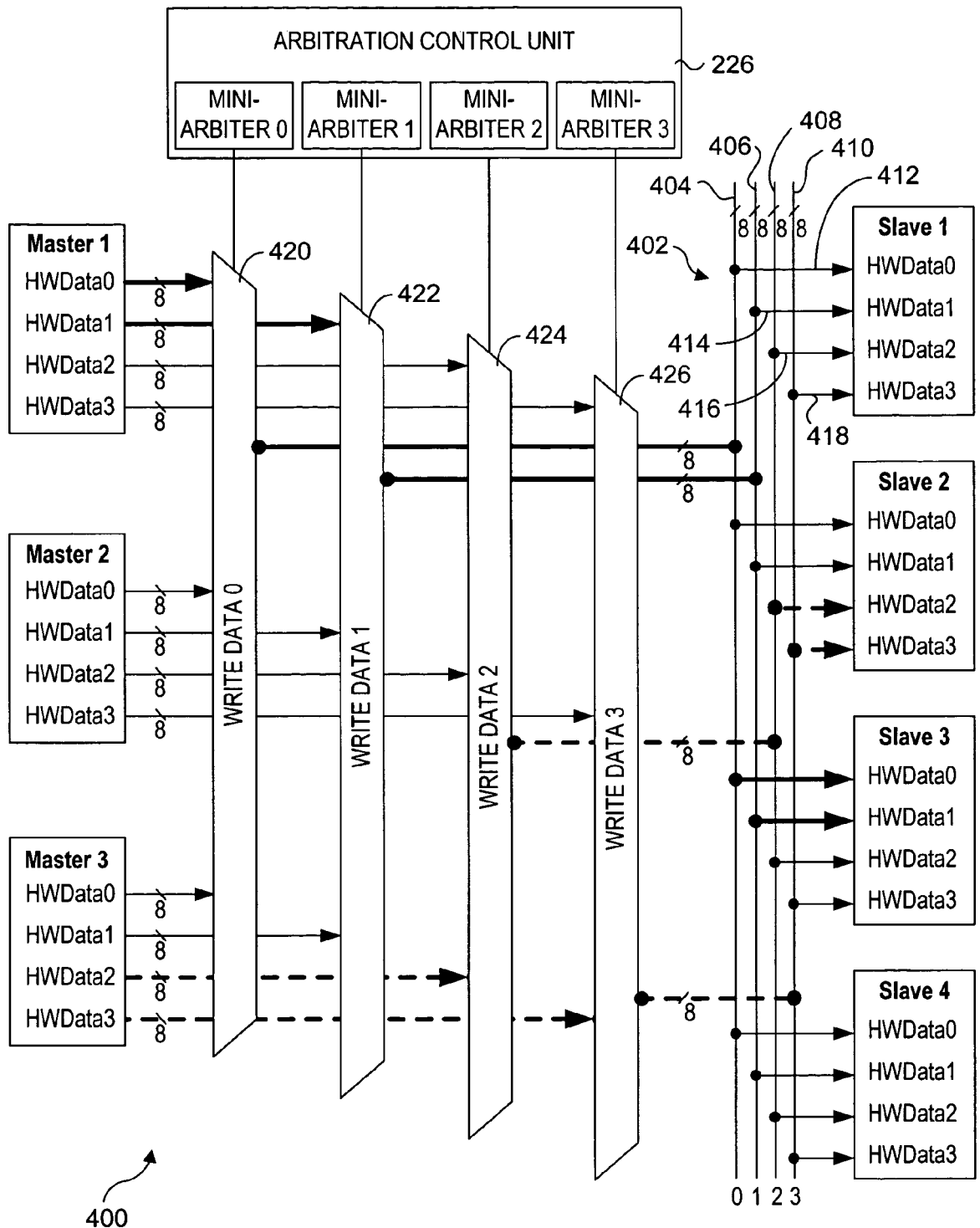
FIG. 4b illustrates a concurrent pair of half-word write data transfers using the split write data bus architecture of FIG. 4.
Figure 4C:
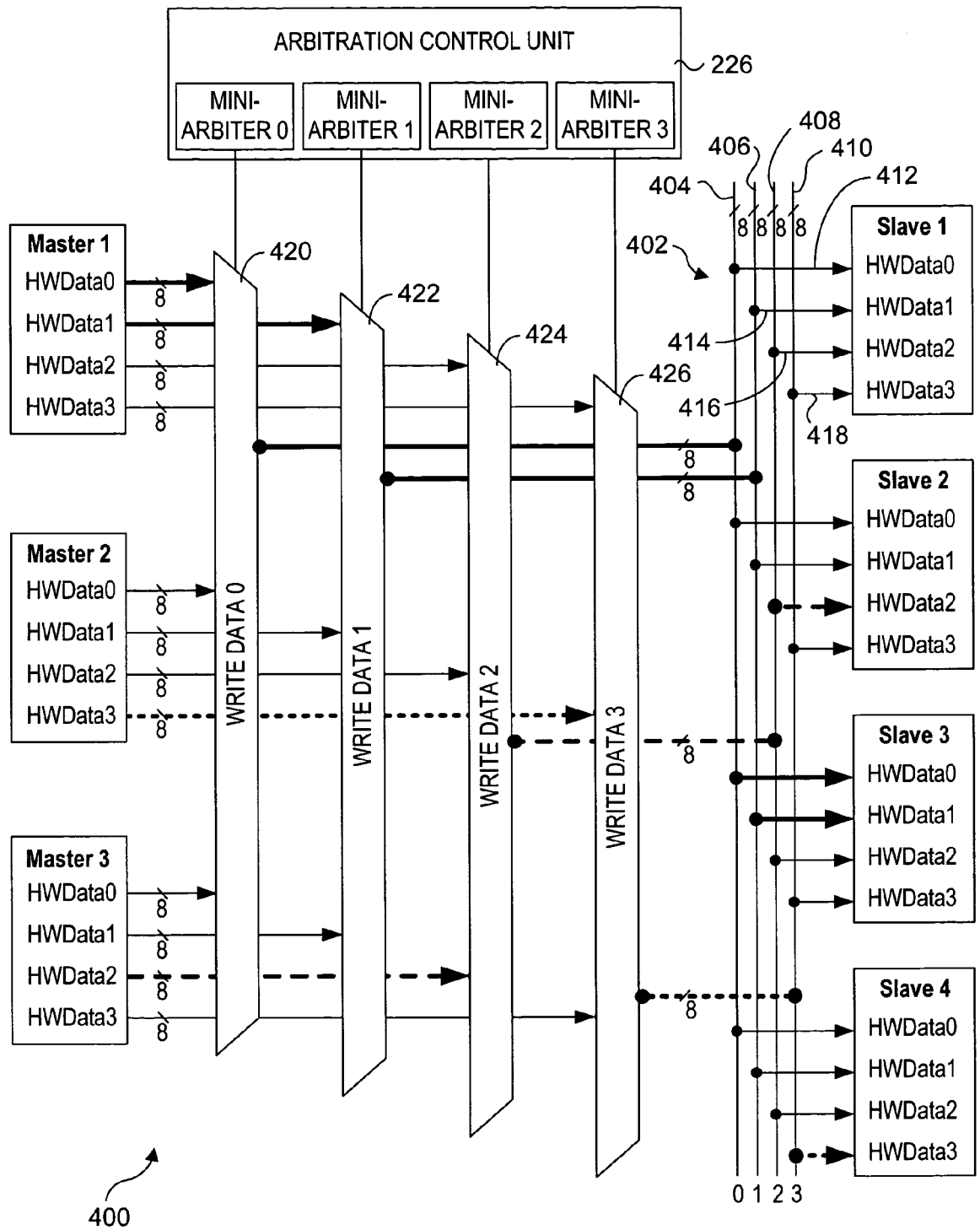
FIG. 4c illustrates a concurrent set of transfers including a pair of single-byte and a half-word word write data transfer using the split write data bus architecture of FIG. 3.

In a manner similar to the split read data bus architecture, split write data bus architecture 400 can support various types of concurrent (or singular) write data transfers during a given write data cycle. For example, a single word write data transfer from Master 1 to Slave 3 is shown in FIG. 4a. In FIG. 4b, a pair of concurrent half-word write data transfers are illustrated, including a half-word transfer comprising data chunks HWData0 and HWData1 from Master 1 to Slave 3, and a half-word transfer comprising data chunks HWData2 and HWData3 from Master 3 to Slave 2. Meanwhile, three concurrent write data transfers are shown in FIG. 4c, including a half-word transfer comprising data chunks HWData0 and HWData1 from Master 1 to Slave 3, a single byte transfer corresponding to data chunk HWData2 from Master 3 to Slave 2, and a single byte transfer corresponding to data chunk HWData3 from Master 2 to Slave 4.

In general, data bus access grants are issued by arbitration control unit 226 in view of existing grants and new requests, using one or more well-known arbitration schemes. For example, the arbitration schemes include but are not limited to round-robin, weighed round-robin, priority-based schemes, and credit-based schemes. In one embodiment, once a transaction for a given master is granted, the master provides a control signal to indicate that it has a current grant for a given portion of the split read data or split write data bus. Accordingly, the arbiter will continue providing a grant to that master until the master provides a bus release control signal or the like, to indicate completion of the current transaction. Under another embodiment, a issued grant may be re-arbitrated if a particular transaction exceeds a certain number of data cycles, as defined by the arbitration logic. For example, suppose that Master 1 desires to perform a large whole word (32-bit) transfer that requires 10 or more data cycles. If granted for the full transfer, Master 1 would effectively "hog" the entire data bus for the 10 or more data cycles. However, in view of the arbitration logic, Master 1 might be initially granted access for few cycles, and then would have to wait for a new grant to continue the transaction. To support this type of split transfer, appropriate communication between a given master and arbitration control unit 226 would be employed.

In one embodiment, the split address, read and write data buses employ control signals that are based on the ARM AMBA (Advanced Microcontroller Bus Architecture) Specification (Rev 2.0, May 13, 1999). More particularly, the control signals are based on those defined for the AMBA Advanced High-performance Bus (AHB). The AMBA AHB arbitration signals include an HBUSREQx bus request, an HLOCKx locked transfer signal, a HGRANTx bus grant signal, an HMASTER[3:0] master number signal, and an HMASTLOCK locked sequence signal, wherein the "x" identifies the applicable master. For access requests, the HSIZE[2:0] signal is used to specify whether the width of the transfer is one byte, a half-word, or a full word. Similarly, in this embodiment the read and write data buses employ signaling and timing based on the ARM AMBA Specification.

Although depicted herein as a split 32-bit bus, this is meant to be merely illustrative and not limiting. In general, the principles of the split address and read and write data buses disclosed herein may be implemented on buses having various widths, such as 32-bit, 64-bit, or even 128-bit. Also as discussed above, the schemes may be scaled to support any number of masters and slaves by implementing appropriate multiplexers and control logic.

In accordance with other aspects of some split data bus embodiments, a reduction of the number of replicated address lines is provided. For example, the split address bus configuration of FIG. 2 employs four 32-bit sets of address bus lines 204, 206, 208, and 210. Conversely, in an internal bus (i.e., within an integrated circuit) implementation, the address of the corresponding masters and slaves can be defined in advanced. Furthermore, there are typically only a relatively small number of masters and slaves. Accordingly, such masters and slaves may be uniquely identified using much less than 32-bits. Therefore, under one embodiment, the bit-width of the address bus lines is reduced to the number necessary to identify each master and slave coupled to the split data bus. For instances in which 32-bit addressing is to be employed, various least significant bits (LSB) or most significant bits (MSB) may be asserted by an appropriate mechanisms using well-known techniques. For example, if there are 8 unique masters and slaves, only 3 address bits are required, and thus each of the 29 other LSBs or MSBs may be tied to a low or high logic level. Accordingly, each of the equivalents to bus line sets 204, 206, 208, and 210 in FIG. 2 would only need to be 3 bits wide. This would significantly reduce the number of vias and the like associated with a typical cross-bar interconnect bus structure.

Exemplary Implementation

Figure 5:
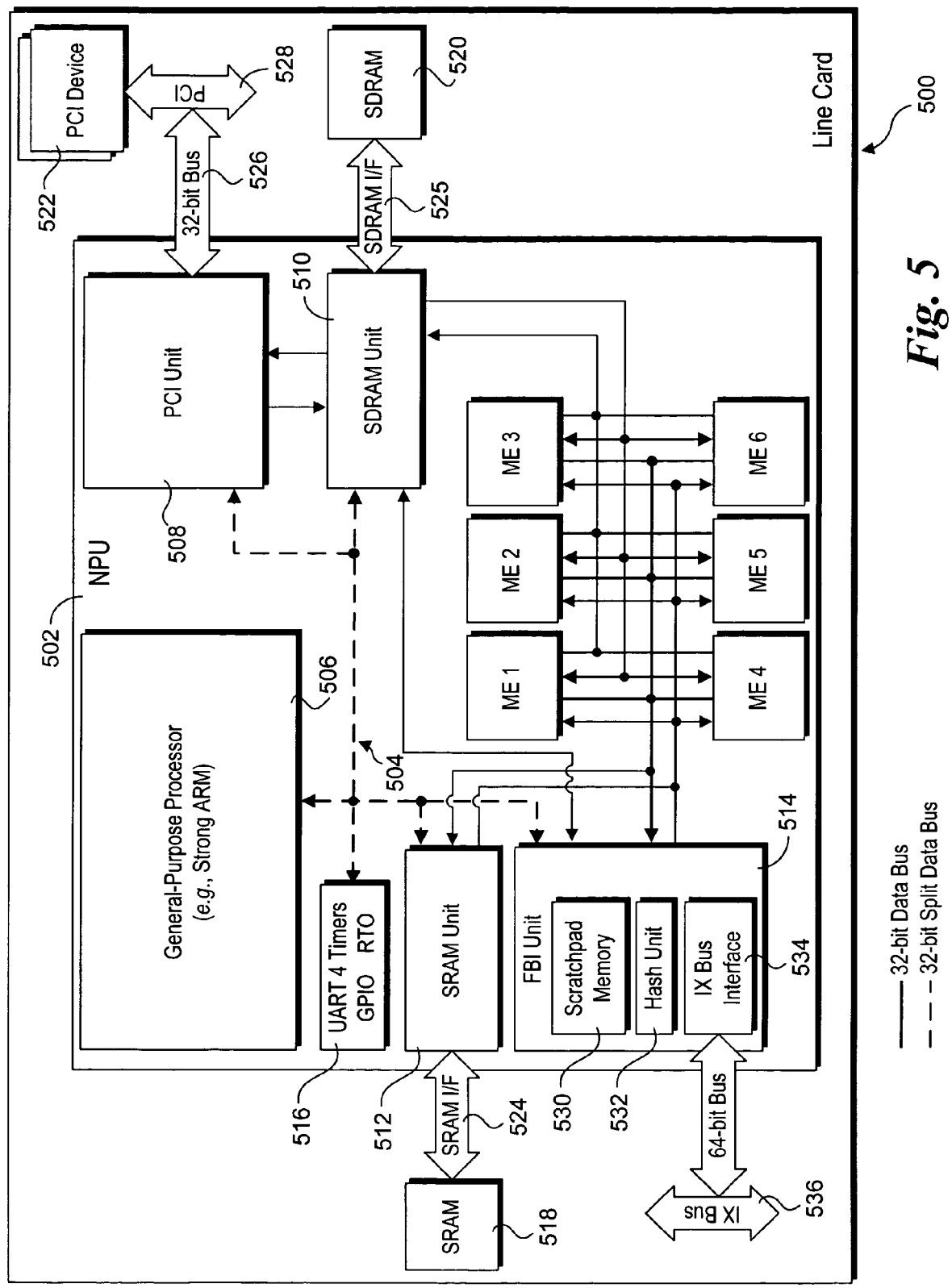
FIG. 5 is a schematic diagram illustrating a network line card including a network processor unit employing an exemplary implementation of the split address, read, and write data buses.

FIG. 5 illustrates a network line card 500 including a network processor unit (NPU) 502 that employs a 32-bit split data bus 504 in accordance with the principles disclosed herein. The NPU 502 shows various components common to the Intel® IXP-1200 NPU architecture, including a general-purpose processor 506, a PCI (Peripheral Component Interconnect) unit 508, an SDRAM (Synchronized Dynamic Random Access Memory) unit 510, an SRAM unit 512, a Fast Bus Interface (FBI) unit 514, and six microengines (MEs) 1-6. The NPU architecture further includes a multi-function block 516 comprising a UART, four timers, a GPIO (General-Purpose Input/Output) interface, and an RTO interface.

In addition to NPU 502, line card 500 hosts an SRAM store 518, an SDRAM store 520, and one or more PCI devices 522. SRAM unit 512 provides access to SRAM store 518 via an SRAM interface (I/F) 524. Similarly, SDRAM unit 510 provides access to SDRAM store 520 via an SDRAM interface 525. PCI unit 508 provides a 32-bit interface 526 to a PCI bus 528 via which one or more PCI devices may be connected, such as depicted by PCI devices 522.

FBI unit 514 provides an interface between MEs 1-6 and other functional units on NPU 502. It includes scratchpad memory 530, a hash unit 532, and in IX Bus interface 534. Additional FBI components not shown include FBI control and status registers. The IX bus interface provides in interface to external devices coupled to an IX bus 536, and includes data buffers to hold receive data arriving from the IX bus and data buffers to hold data to be sent to the Ix bus.

As discussed above, the split data bus architecture supports communication between masters and slaves. In one embodiment employing the aforementioned AMBA AHB data and control signals, the masters operate as bus-mastering devices, wherein a master that is granted access to the bus manages transfer of data over the granted portion of the bus for one or more data cycles without requiring the assistance of a processor or the like.

In general, the various components in FIG. 5 shown coupled to split data bus 504 may operate as masters, slaves, or both. For example, general-purpose processor 506 will typically operate as a master, which each of SRAM unit 512, SDRAM unit 520, and multi-function unit 516 will operate as slaves. Meanwhile, each of FBI unit 514 and PCI unit 508 may operate as both a master and a slave (one at a time for a given transaction).

It is noted that under the foregoing exemplary embodiments, a 32-bit data bus is split into four 8-bit segments. This is meant to be merely illustrative of the general split-data bus principles disclosed herein, and not limiting. For example, a 64-bit data bus could be split into four 16-bit segments, eight 8-bit segments, or other combination of segments and sizes.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
    granting access to a first master to master a first portion of a data bus during a first set of data cycles including a first data cycle;
    transferring a first portion of data across the data bus between the first master and a first slave during the first data cycle;
    concurrently transferring a second portion of data across the data bus between a second master and a second slave during the first data cycle;
    receiving, during the first set of data cycles, a data access request from a third master to access a third slave using a second portion of the data bus; and
    granting access to the third master to master the second portion of the data bus during at least one data cycle that is performed in concurrence with a data cycle in the first set of data cycles.

2. The method of claim 1, further comprising:
    concurrently transferring a third portion of data across the data bus between a third master and a third slave during the first data cycle.

3. The method of claim 1, further comprising:
    concurrently transferring a fourth portion of data across the data bus between a fourth master and a fourth slave during the first data cycle.

4. The method of claim 1, further comprising:
    transferring a full bus width of data across the data bus between a master and slave during a second data cycle.

5. The method of claim 1, further comprising:
    supporting concurrent transfer of data across the data bus during a single data cycle comprising at least one of:
    a single byte transfer;
    two single byte transfers;
    three single byte transfers;
    four single byte transfers;
    one half-word transfer;
    a single byte transfer and a half word transfer;
    two half-word transfers; and
    two single byte transfers and a half word transfer.

6. The method of claim 1, wherein the data bus comprises a 32-bit data bus, the method further comprising:
    splitting the 32-bit data bus into four 8-bit segments; and
    enabling data to be transferred using integer multiples of the four 8-bit segments.

7. The method of claim 6, further comprising:
    implementing an arbitration control unit to arbitrate access to the 32-bit data bus, the arbitration control unit including four mini-arbiters, each to arbitrate access to a respective 8-bit segment of the data bus in view of access requests submitted from masters to the arbitration control unit.

8. The method of claim 1, further comprising:
    enabling data access requests from multiple masters to be received for arbitration during a single address cycle, the data access requests being received by an address bus associated with the data bus.

9. The method of claim 1, wherein the address bus comprises a read data bus.

10. The method of claim 1, wherein the address bus comprises a write data bus.

11. An apparatus comprising:
    a split data bus, split into multiple data bus segments;
    a plurality of masters, operatively coupled to the split data bus;
    a plurality of slaves, operatively coupled to the split data bus;
    a plurality of data multiplexers, to multiplex access to the multiple data bus segments; and
    an arbitration control unit, to arbitrate access to the split data bus and control routings of data signals sent over the split data bus via the plurality of multiplexers,
    a split address bus, split into multiple segments, the split address bus operatively coupled to the plurality of masters and the plurality of slaves and capable of issuing multiple concurrent different addresses to the plurality of masters and the plurality of slaves; and
    wherein the apparatus, upon operation, supports multiple concurrent data transfers between master-slave pairs, the concurrent data transfers facilitated via respective portions of the split data bus comprising at least one data bus segment.

12. The apparatus of claim 11, wherein the split data bus comprises a read data bus, and the plurality of data multiplexers are coupled between the plurality of slaves and the split data bus, each data multiplexer coupled to receive a respective data chunk from each of the slaves and having an output coupled to a set of bus lines corresponding to a respective data bus segment associated with the respective data chunks for that data multiplexer, and wherein each master includes respective input connections tied to each of the data bus segments.

13. The apparatus of claim 11, wherein the split data bus comprises a write data bus, and the plurality of data multiplexers are coupled between the plurality of masters and the split data bus, each data multiplexer coupled to receive a respective data chunk from each of the masters and having an output coupled to a set of bus lines corresponding to a respective data bus segment associated with the respective data chunks for that data multiplexer, and wherein each slave includes respective input connections tied to each of the data bus segments.

14. The apparatus of claim 11, wherein the arbitration control unit includes a plurality of mini-arbiters, each mini-arbiter coupled to control a respective data multiplexer.

15. The apparatus of claim 11, wherein the split data bus comprises a first split data bus comprising a read data bus and the plurality of data multiplexers comprise a plurality of read data multiplexers, the apparatus further comprising:
 a second split data bus comprising a write data bus split into multiple read data bus segments, the plurality of masters and plurality of slaves operatively coupled to the write data bus; and
 a plurality of write data multiplexers, to multiplex access to the multiple read data bus segments, the plurality of write data multiplexers controlled via the arbitration control unit.

16. The apparatus of claim 11, wherein
 each segment of the split address bus has a width matching one of an address width or partial address width employed for sending address request information between a master and a slave, the apparatus further comprising:
 a first set of address multiplexers, each coupled between a respective master and the split address bus;
 a second set of address multiplexers, each coupled between a respective slave and the split address bus,
 wherein the first and second set of address multiplexers are controlled via the arbitration control unit.

17. The apparatus of claim 11, wherein the apparatus comprises a network processor unit.

18. A network line card, comprising:
 a network processor unit (NPU) including:
  a split read data bus;
  a split write data bus;
  an arbitration control unit;
  a split address bus capable of issuing multiple concurrent different addresses;
  a plurality of master components, operatively coupled to each of the split address bus, split read data bus, and split write data bus;
  a plurality of slave components, operatively coupled to each of the split address bus, split read data bus, and split write data bus, the plurality of slave components including a Static Random Access Memory (SRAM) unit and a Dynamic Random Access Memory (DRAM)-based unit; and
  a plurality of compute engines, operatively coupled to each of the SRAM unit and the DRAM-based unit;
 an SRAM store, coupled to the SRAM unit via an SRAM interface; and
 a DRAM-based store, coupled to the DRAM-based unit via a DRAM interface,
wherein the NPU, upon operation, supports multiple concurrent data transfers between master-slave component pairs on each of the split read data bus and split write bus.

19. The network line card of claim 18, wherein one of the masters comprises a Peripheral Component Interconnect (PCI) unit, and the network line card further comprises:
 a PCI bus coupled to the PCI unit; and
 at least one PCI device, coupled to the PCI bus.

20. The network line card of claim 18, wherein one of the masters comprises a Peripheral Component Interconnect (PCI) unit, and the network line card further comprises:
 a PCI bus coupled to the PCI unit; and
 at least one PCI device, coupled to the PCI bus.

21. The network line card of claim 18, wherein the DRAM-based unit comprises an Synchronous DRAM (SDRAM) unit, and the DRAM-based store comprises an SDRAM store.

* * * * *